United States Patent [19]

Tanaka et al.

[11] Patent Number: 5,353,077
[45] Date of Patent: Oct. 4, 1994

[54] PHOTOGRAPHIC CAMERA HAVING ALSO FUNCTION OF PANORAMIC PHOTOGRAPHING

[75] Inventors: Yasuhiko Tanaka; Ken Ishioka; Mitsuo Yokota, all of Ohmiya, Japan

[73] Assignee: Fuji Photo Optical Co., Ltd., Ohmiya, Japan

[21] Appl. No.: 170,442

[22] Filed: Dec. 20, 1993

Related U.S. Application Data

[63] Continuation of Ser. No. 868,634, Apr. 14, 1992, abandoned.

[30] Foreign Application Priority Data

Apr. 15, 1991 [JP] Japan .................................. 3-33916[U]
Apr. 15, 1991 [JP] Japan .................................. 3-109753

[51] Int. Cl.5 ............................................. G03B 37/00
[52] U.S. Cl. ....................................... 354/94; 354/159; 354/222; 354/195.1
[58] Field of Search ....................... 354/94, 95, 96, 98, 354/99, 195.1, 199, 222, 159

[56] References Cited

U.S. PATENT DOCUMENTS 5,083,146 1/1992 Ueda .................................. 354/222 X
5,086,311 2/1992 Naka et al. ........................ 354/94 X
5,255,030 10/1993 Mukai et al. ..................... 354/94

*Primary Examiner*—Howard B. Blankenship
*Attorney, Agent, or Firm*—Price, Heneveld, Cooper, DeWitt & Litton

[57] ABSTRACT

A photographic camera having also a function of panoramic photographing includes a panorama switch which is turned ON to change over the mode of photographing to the mode of panoramic photographing and to activate a drive motor to forcibly move an objective along the optical axis to the minimum focal distance position. A slidably movable knob member serving for switching of the photographing mode is provided laterally of a viewfinder, and a photographing mode display appears on the external surface of the camera as the knob is slidably moved to select the mode of panoramic photographing. When the mode of panoramic photographing is selected and the panorama switch is turned ON, a liquid crystal display unit adapted to display various data including a film frame count displays the camera mode of panoramic photographing. A sighting frame for normal photographing and a sighting frame for panoramic photographing are both arranged within the viewfinder frame.

24 Claims, 10 Drawing Sheets

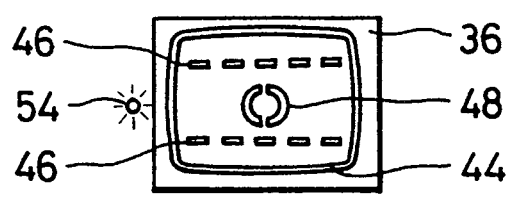
F I G. 8 (a)
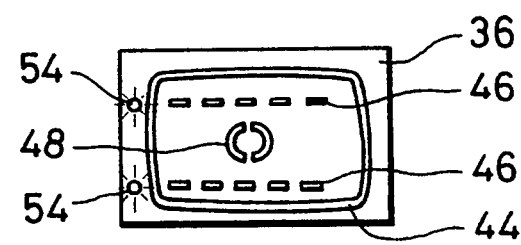
F I G. 8 (b)

PHOTOGRAPHIC CAMERA HAVING ALSO FUNCTION OF PANORAMIC PHOTOGRAPHING

This is a continuation of co-pending application Ser. No. 07/868,634, filed on Apr. 14, 1992, now abandoned.

FIELD OF THE INVENTION

This invention relates to a photographic camera having a function of panoramic photographing and a variable focal distance as is usual in the bifocal camera or the zoom lens camera and wherein selective switching is possible between a mode of normal photographing and a mode of panoramic photographing.

BACKGROUND OF THE INVENTION

The photographic cameras, particularly so-called compact cameras having, in addition to a function of normal photographing, a function of panoramic photographing have recently come into wide use as the manner or fashion in which photographing is enjoyed or utilized has rapidly become variegated. With such camera having also the function of panoramic photographing, there are usually provided along upper and lower edges of the aperture a pair of rotatable dousers adapted for partially covering the aperture during operation of the panoramic photographing so that upper and lower portions of a film frame are not exposed, resulting in a picture which is long from side to side. Additionally, use of a wide angle lens having a wide angle of view as an objective provides an effective panoramic picture. To make a normal photograph, the dousers are retracted from the portions of the aperture which have been covered by said dousers so that the film frame may be entirely exposed.

Compact cameras provided with variable focus adapted to vary the focal distance of the objective, such as bifocal means or zoom lens are also well known. With such cameras, in order to simplify the operation of varying the focal distance, a motor drive is usually utilized to move the objective along the optical axis thereof. Today, many of the cameras having also the function of panoramic photographing are provided with such a variable focus.

For the camera having also the function of panoramic photographing and provided with a variable focus it is desired to employ an objective of wide angle to achieve an effective panoramic photograph. In fact, the well known camera of this type employs the objective having the minimum focal distance or the order of 28 mm to achieve a wide angle photograph.

However, with the conventional camera provided with the variable focus, there is an apprehension that the panoramic photographing might be taken erroneously with the objective positioned at the maximum focal distance, because change-over of the focal distance is set by a photographer and the objective is immediately driven by the motor to the focal distance set by the photographer. A picture obtained by photographing with the objective positioned at the maximum focal distance will have no panoramic effect, against the photographer's intention.

If it is unclear at the moment of shutter release whether the camera is in the mode of normal photographing or in the mode of panoramic photographing, there is an apprehension that the resultant picture might be different from the intended one. More specifically, if the photographer carelessly takes the mode of panoramic photographing for the mode of normal photographing when the shutter is released, the resultant picture will have upper and lower portions cut away and, if the photographed object contains a figure, the figure will sometimes be headless in the resultant picture. On the other hand, if the photographer carelessly takes the mode of normal photographing for the mode of panoramic photographing when the shutter is released, it will be difficult for the resultant picture to have grandeur and powerfulness characterizing the panoramic picture since the shutter is released really at the camera condition for a snapshot.

Accordingly, it is an object of the invention to provide a photographic camera having also a function of panoramic photographing and provided with variable focus a means adapted to assure a panoramic effect when panoramic photographing is intended.

It is another object of the invention to provide a photographic camera having also a function of panoramic photographing which allows a photographer to reliably recognize whether the mode of photographing selected is a mode of normal photographing or a mode of panoramic photographing and eliminates an apprehension that the photographing might result in a picture being different from the one the photographer intended.

SUMMARY OF THE INVENTION

The invention resides in a photographic camera having also a function of panoramic photographing comprising a variable focus utilizing a motor drive to move an objective and thereby to vary a focal distance. A manipulator selectively switches between a mode of normal photographing, in which a picture of normal size should be obtained, and a mode of panoramic photographing in which a picture of panoramic size should be obtained. The objective is moved by the motor drive to the minimum focal distance position when the manipulator is operated to select the mode of panoramic photographing. When the mode of panoramic photographing is selected, the objective is moved to the minimum focal distance position and locked on this position so that the focal distance of the objective can not be varied.

Preferably, the manipulator comprises a knob member adapted to be slidably moved relative to a camera body. A photographing mode display adapted to display at least one of the mode of normal photographing and the mode of panoramic photographing is operatively associated with the knob member so that the photographing mode appears on the external surface of the camera body as the knob member is slidably moved to select said one of the photographing modes. The photographing mode display is incorporated into the photographic camera having also a function of panoramic photographing in which the objective is moved to the minimum focal distance position when the mode of panoramic photographing is selected. The knob member is provided laterally of a viewfinder.

The camera further comprises state display means adapted to display a current state of the camera so that, when the mode of panoramic photographing is selected, the state display displays that the camera is in the mode of panoramic photographing. Such state display is incorporated in the photographic camera having also a function of panoramic photographing in which the objective is moved to the minimum focal distance position when the mode of panoramic photographing is selected.

The camera further comprises a sighting frame for normal photographing and a sighting frame for panoramic photographing, both arranged within a visual field of the viewfinder. Such viewfinder is incorporated in the photographic camera having also a function of panoramic photographing, in which the objective is moved to the minimum focal distance position when the mode of panoramic photographing is selected.

Preferably, there are provided with the visual field of the viewfinder a sighting frame for normal photographing, a sighting frame for panoramic photographing and photographing mode display so that the photographing mode selected by operation of the manipulator.

Preferably, the photographing mode display comprises a display lamp so that said display lamp is put on light when one of the normal photographing mode and the panoramic photographing mode is selected, and put out when the other mode is selected.

The invention resides also in a photographic camera having also a function of panoramic photographing characterized in that selectively switching is possible between a mode of normal photographing in which a picture of normal size should be obtained and a mode of panoramic photographing in which a picture of panoramic size should be obtained. A panoramic photographing mode display is provided by which a photographer can recognize that the camera is in the mode of panoramic photographing when the mode of panoramic photographing has been selected.

BRIEF DESCRIPTION OF THE DRAWINGS

FIG. 8 is diagram showing the viewfinder frame in the second embodiment laterally of which there is provided state display (a) in the form of a single light emitting diode and (b) in the form of paired light emitting diodes serving to display that the camera is in the mode of panoramic photographing;

DESCRIPTION OF THE PREFERRED EMBODIMENTS

Figure 5:
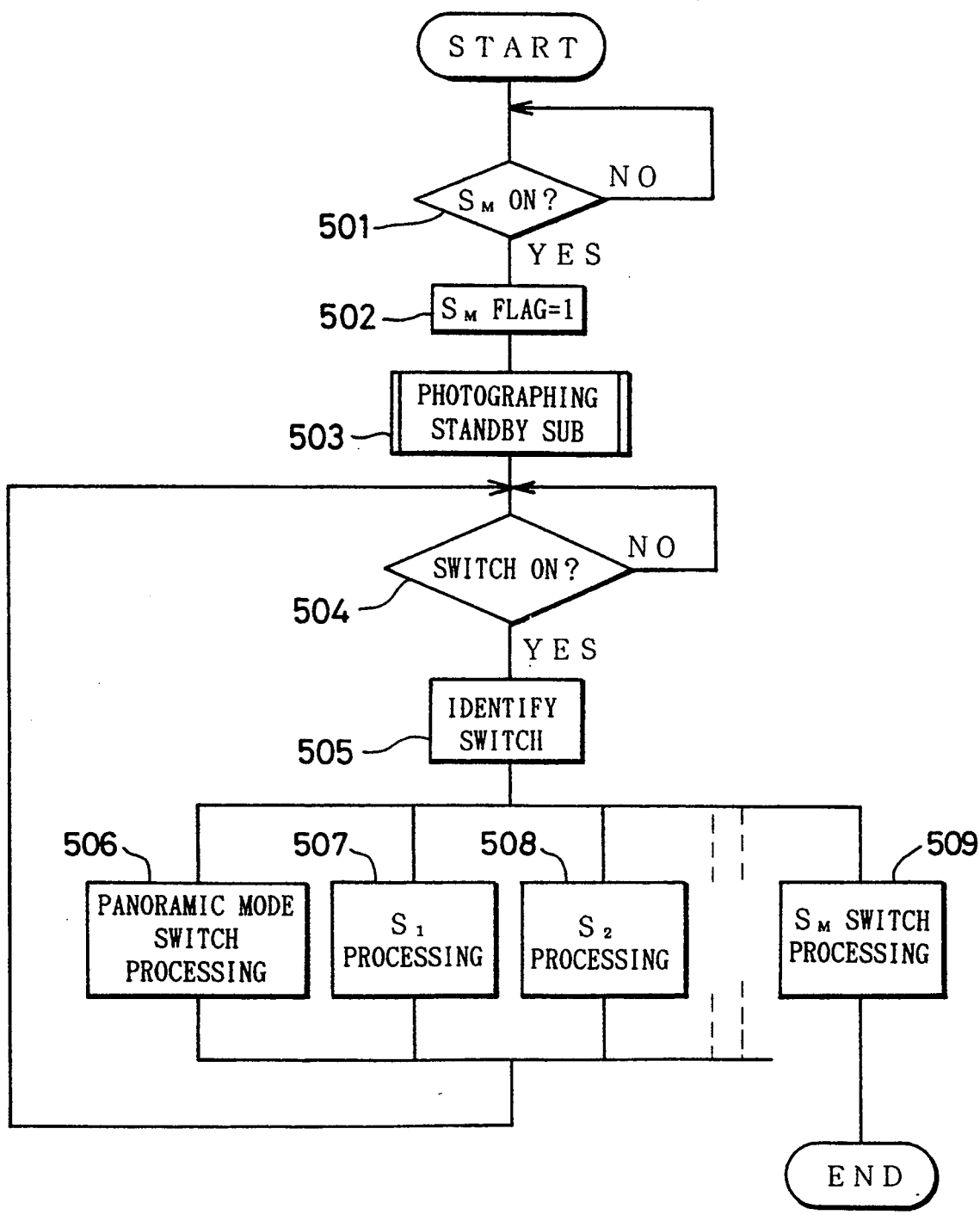
FIG. 5 is flow chart illustrating a routine to be followed until various processings are made after the camera according to the first embodiment has been brought into a state ready for actual photographing.
Figure 6:
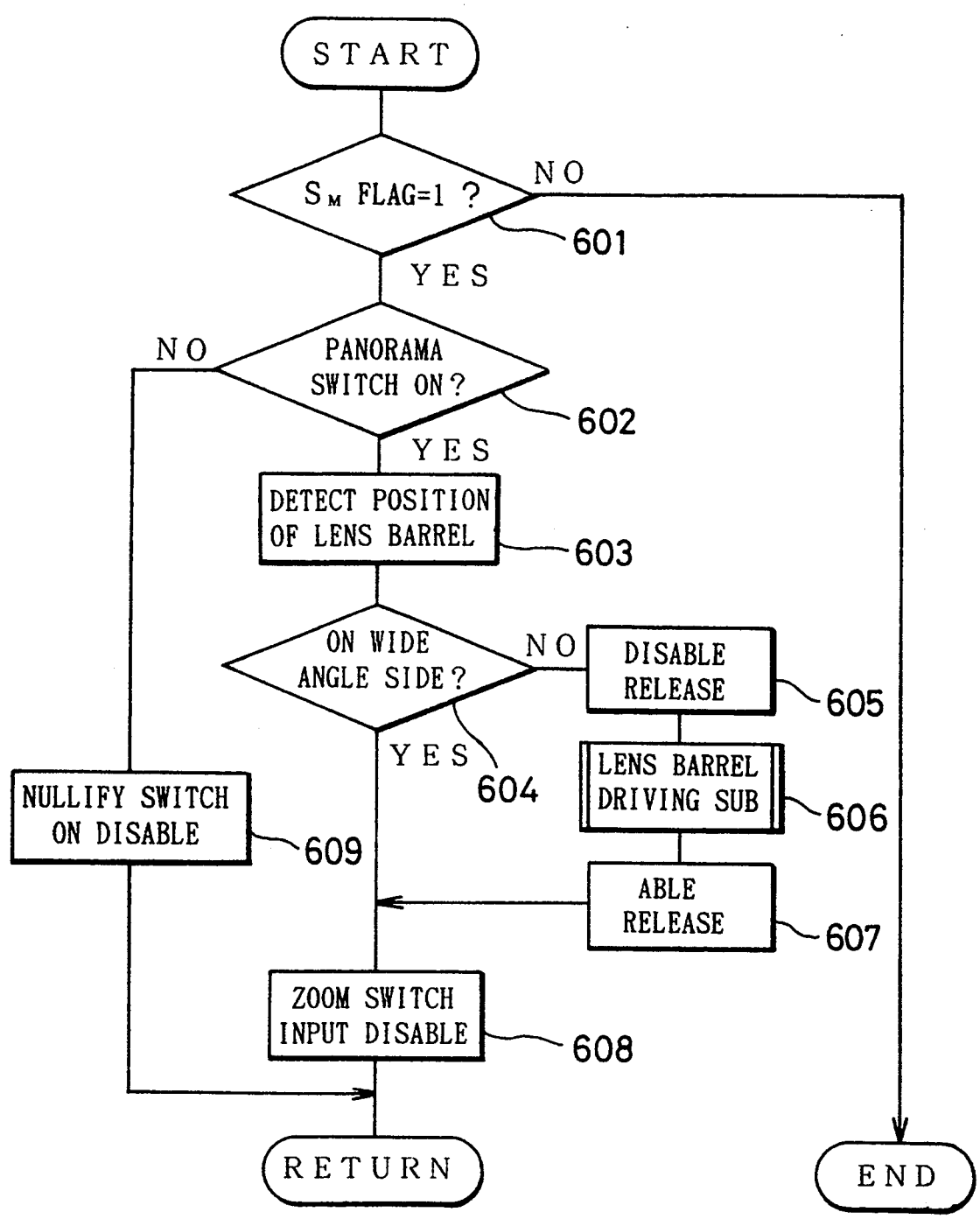
FIG. 6 is a flow chart illustrating a routine for panoramic processing to be made when the mode of panoramic photographing has been selected by operating the manipulator in the first embodiment.
Figure 7:
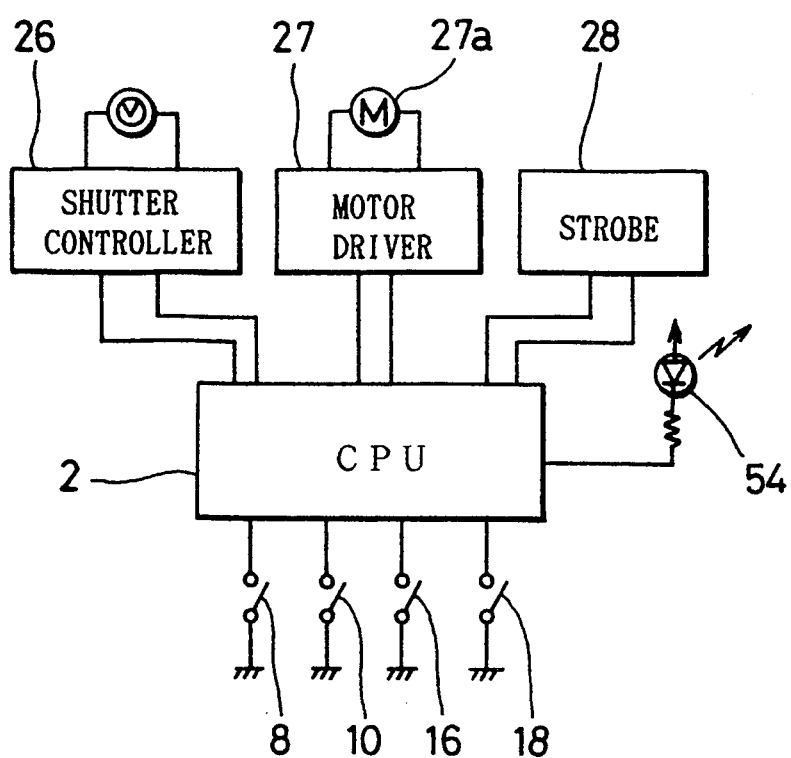
FIG. 7 is a block diagram schematically showing a circuit arrangement of the photographic camera having also a function of panoramic photographing according to a second embodiment of the invention.
Figure 9:
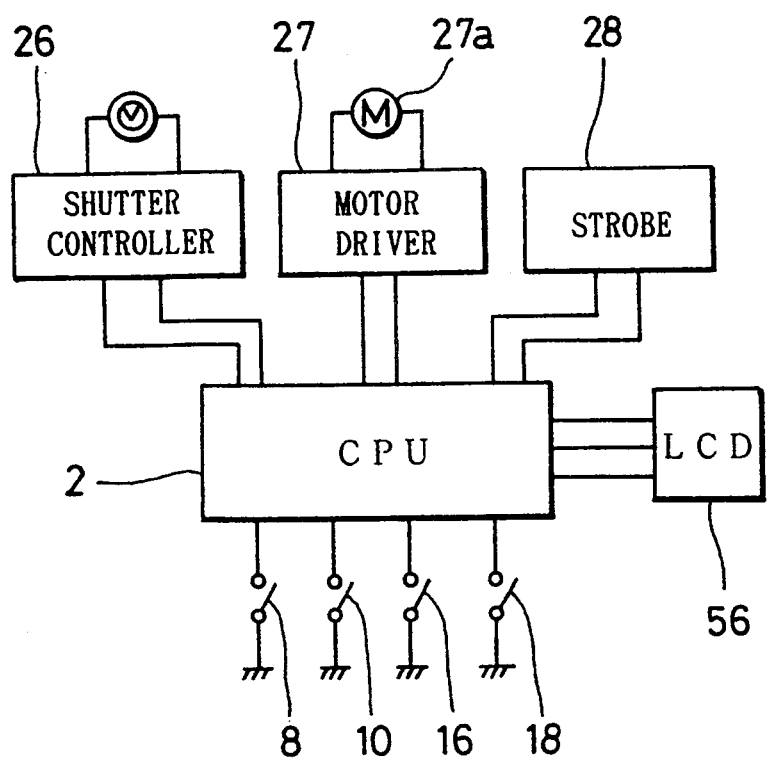
FIG. 9 is a block diagram schematically showing a circuit arrangement of the photographic camera having also a function of panoramic photographing according to a third embodiment of the invention.
Figure 10A:
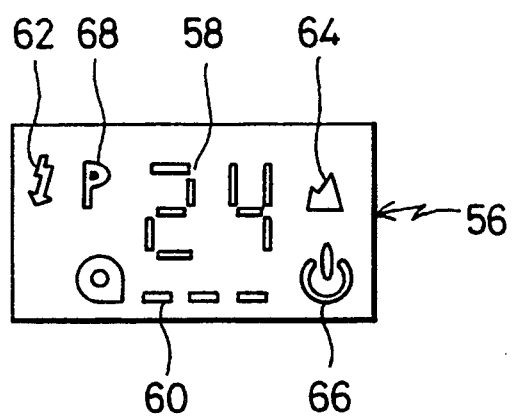
FIG. 10 is a plan view of a liquid crystal display unit in the third embodiment (a) in the case wherein a display of the panoramic photographing mode is provided as a part of the liquid crystal display unit and (b) in the case wherein a display for film frame count serves also for display of the panoramic photographing mode.
Figure 10B:
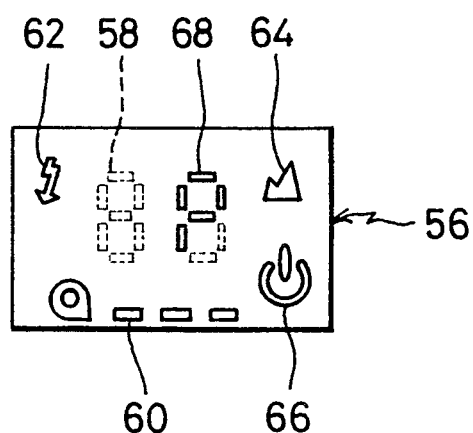
Figure 11:
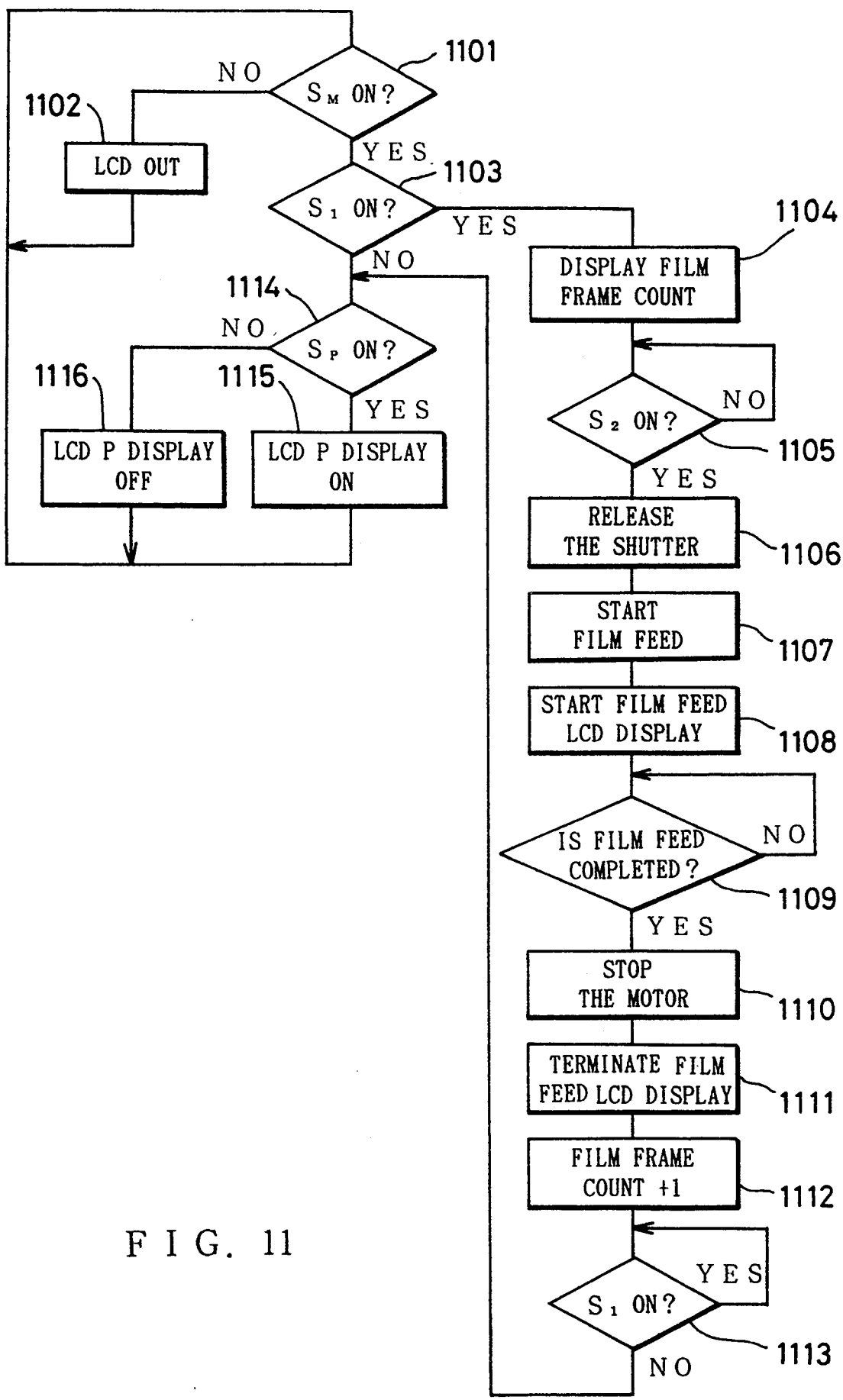
FIG. 11 is a flow chart illustrating a routine for display of the panoramic photographing mode in the third embodiment as shown by FIG. 10(b).

The photographic camera functioning also as panoramic camera according to the invention will now be described in more detail with reference to the attached drawings, in which FIGS. 1 through 6 illustrate a first embodiment, FIGS. 7 and 8 illustrate a second embodiment, and FIGS. 9 through 11 illustrate a third embodiment.

First Embodiment

Figure 1:
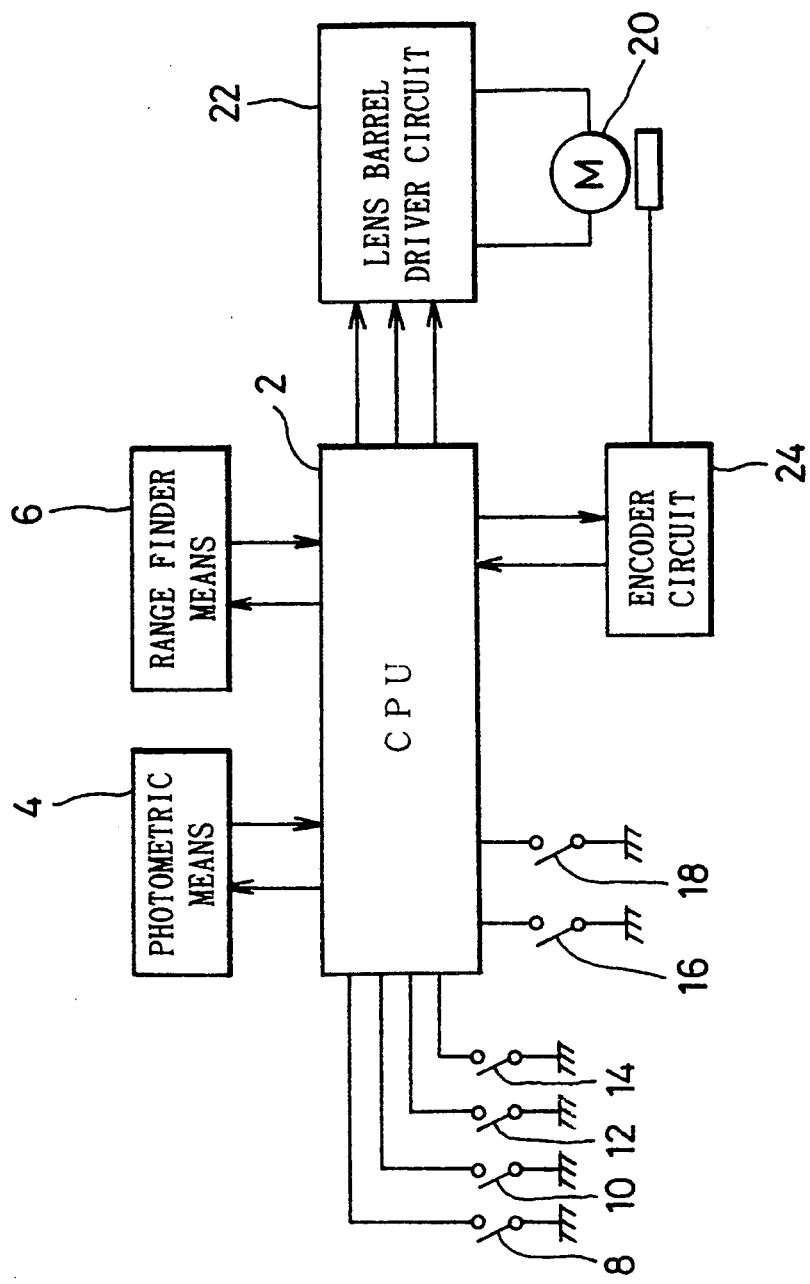
FIG. 1 is a block diagram schematically showing a circuit arrangement of the photographic camera having also a function of panoramic photographing according to a first embodiment of the invention.

FIG. 1 is a circuit block diagram schematically showing the photographic camera of the invention, which includes a CPU 2 at the center of the arrangement. Photometric means 4 serving for measurement of luminance on an object to be photographed is coupled to said CPU 2 and the object luminance information is exchanged therebetween. There is also coupled to the CPU 2 a range finder 6 serving to find a distance to the object for autofocusing, and the distance information is exchanged therebetween.

ON-OFF signals for a first stage shutter switch 8 and a second stage shutter switch 10 are applied to the CPU 2, wherein the switches 8, 10 are operatively associated with a release button 52 on the camera 30 (FIG. 2) so that the first stage shutter switch 8 is turned ON when said release button 52 is depressed halfway and the second stage shutter switch 10 is turned ON when the release button 52 is fully depressed. When the first stage shutter switch 8 is turned ON, the photometric means 4 provides the object luminance data and the range finder means 6 provides the distance data. Upon turning ON of the second stage shutter switch 10, the shutter is released to effect an exposure.

Reference numerals 12, 14 designate zoom switches; More specifically, a telephoto switch 12 is operated to move an objective 34 toward a telephoto position (corresponding to the maximum focal distance position) and a wide angle side switch 14 is operated to move the objective 34 toward a wide angle position (corresponding to the minimum focal distance position). Operation of these switches 12, 14 activates a drive motor as will be described later to move the objective 34 along an optical axis. ON-OFF signals for a main switch ($S_M$) 16 (FIG. 2) also are applied to the CPU 2 so that the camera 30 becomes ready for photographing when said main switch 16 is turned ON.

The CPU 2 is applied also with ON-OFF signals for a panorama switch 18 and the mode of panoramic photographing may be selected by turning this panorama switch 18 ON. It should be understood that the mode of normal photographing is set with said panorama switch 18 being turned OFF.

Figure 2:
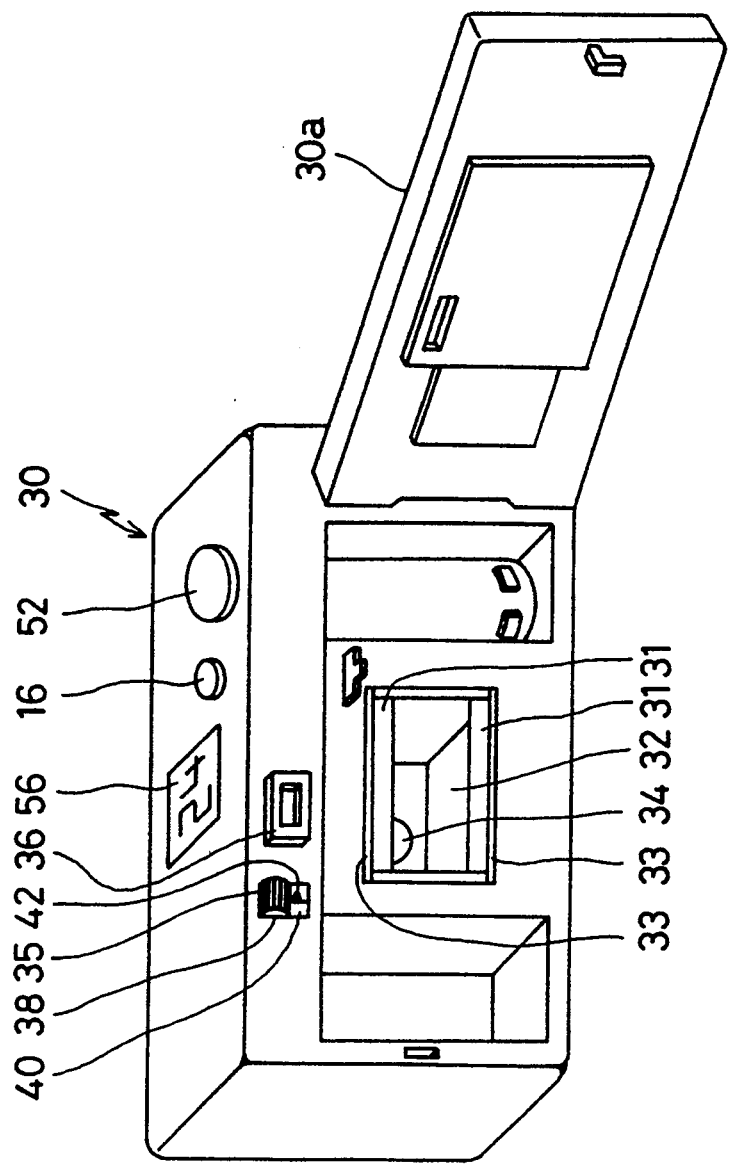
FIG. 2 is a perspective view showing said photographic camera according to the first embodiment with its rear cover being opened.

FIG. 2 is a schematic perspective view showing the camera 30 with a rear cover 30a thereof open. The camera 30 is provided with a pair of dousers 31 extending along upper and lower edges of an aperture 32, respectively, and being rotatable around axes extending in parallel to the upper and lower edges of the aperture 32. In the mode of panoramic photographing, as shown in FIG. 2, the dousers 31 partially cover upper and lower halves of the aperture 32. Though not shown, a film frame is pressed by the rear cover 30a being closed against guide rails 33 extending along upper and lower edges of rear opening defined by the aperture 32. Light rays coming from the object through the objective 34 are partially intercepted by the dousers 31 from being incident upon upper and lower portions of the film frame so that these upper and lower portions remain unexposed, resulting in a picture which is long from side to side.

In the mode of normal photographing, the dousers 31 retract from their positions at which they partially cover the aperture 32 and fully open the aperture 32. As a result, the light rays coming from the object are incident upon the entire extent of the aperture 32 and the film frame is entirely exposed.

The camera 30 contains therein a drive mechanism (not shown) for rotation of the dousers 31 and has a knob member 35 laterally of a viewfinder 36 so that said knob member 35 may be operated to activate the drive mechanism. The knob member 35 slidably movable in vertical direction relative to the camera 30 and such slidable movement of this knob member 35 causes the drive mechanism to rotate the dousers 31. It should be understood that the drive mechanism may be adapted to mechanically transmit the slidable movement of the knob member 35 to the dousers 31 or adapted to rotate the dousers 31 by an actuator such as an electric motor. In the case of the drive mechanism employing the electric motor, the knob member 35 functions as a switch for the motor driver circuit. Upon operation of the knob member 35 so as to select the mode of panoramic photographing, the panorama switch 18 is turned ON.

As will be apparent from FIG. 3, the knob member 35 has an end projecting outward from a display frame 38 formed on the camera 30 and is slidably movable within the display frame 38. A base end of the knob member 35 is secured to an actuator plate 40 so that said actuator plate 40 is slidably moved together with said knob member 35 in the same direction as the latter is slidably moved.

Figures 3A, 3B:
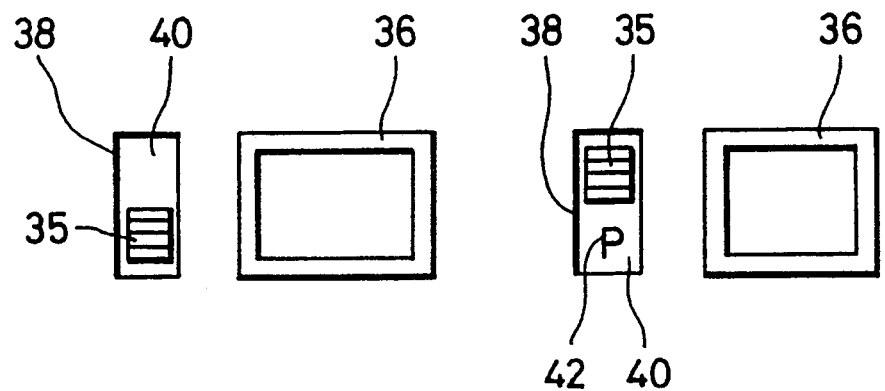
FIG. 3 is a rear view showing a viewfinder and a manipulator in the first embodiment (a) when the camera is in the mode of normal photographing and (b) when the camera is in the mode of panoramic photographing.

The actuator plate 40 is provided over a portion thereof adapted to become visible when the mode of panoramic photographing is selected with a photographing mode display 42, as "P" in FIG. 2 and FIG. 3(b), indicating that the mode of panoramic photographing has been selected.

Figure 4:
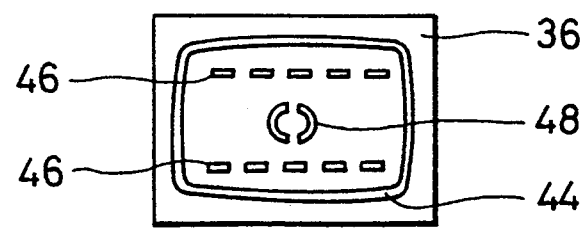
FIG. 4 is a schematic diagram showing a viewfinder frame in the first embodiment.

Referring to FIG. 4, there are provided within a frame of the viewfinder 36 a normal sighting frame 44 for the mode of normal photographing and a panoramic sighting frame 46 for the mode of panoramic photographing. In addition to these sighting frames, the viewfinder 36 is centrally provided with a target mark 48 for autofocussing so that this target mark 48 may be aligned with an object to be photographed to focus the camera on this object.

The objective 34 shown by FIG. 2 is held by a lens barrel (not shown) which is, in turn, driven by a drive motor 20 so as to move integrally with the objective 34 along the optical axis of the camera 30 and the drive motor 20 is electrically connected to and driven by a lens barrel driver circuit 22. This lens barrel driver circuit 22 is connected to the CPU 2 and responsive to a drive signal, such as a forward rotation, drive signal reverse rotation drive signal, or stoppage signal provided from the CPU 2 to drive or stop the drive motor in the corresponding manner. Between the lens barrel and a body of the camera 30 there is provided an encoder circuit 24 adapted to detect a position of the lens barrel. This encoder circuit 24 also is connected to the CPU 2 and information on the lens barrel's position is exchanged therebetween.

Now a routine with which the camera of the above-mentioned arrangement is operated will be discussed with reference to FIGS. 5 and 6.

Referring to FIG. 5, the camera 30 is standing by ready for turning ON of the main switch 16 (step 501). When the main switch 16 is turned ON, the routine proceeds to a step 502 at which 1 is stored in a $S_M$ flag and then a photographing standby subroutine is run at a step 503. This photographing standby routine involves moving the objective 34 to a position ready for actual photographing and charging a capacitor of a strobe circuit.

Upon completion of preparation for photographing, the camera is in a state of waiting for turning ON of any one switch, such as the shutter switches 8, 10, the telephoto side switch 12, the wide angle side switch 14, the panorama switch 18, or the other switches, i.e., in the standby state (step 504). When any one of these switches is operated, the operated switch is identified (step 505) and a processing required for this particular switch is run. More specifically, if the first stage shutter switch ($S_1$) 8 has been operated, the routine proceeds to a step 507 at which a luminance on the object is measured by the photometric means 4 and applied to the CPU 2 and a photographing range is found by the range finder 6 and applied to the CPU 2. Upon receiving this data, the CPU 2 determines a stop value as well as a shutter speed on the basis of the luminance information and moves the objective 34 to a focused position on the basis of the range information. The routine returns to the step 504 and waits for next turning ON of any other switch. If the second stage shutter switch ($S_2$) 10 is operated, the routine proceeds to a step 508 at which the shutter is released to effect an exposure and then the routine returns to step 504. When the main switch ($S_M$) 16 is turned OFF, the $S_M$ flag is set to 0 and other additional operations are performed, such as retraction of the objective 34 into the body of the camera 30 (step 509), so that the camera 30 is no longer ready for photographing, but becomes handy to carry.

If it is determined at the step 505 that the panorama switch 18 has been turned ON, the routine proceeds to a step 506 at which a panorama mode process is run. In the panorama mode process, as shown in FIG. 6, it is determined at a step 601 whether the $S_M$ flag is 1 and, if not, the camera 30 is brought into a state waiting for turning ON of the main switch 16 after the panorama mode processing has been completed (step 501). If the $S_M$ flag is 1, the routine proceeds to a step 602 at which it is determined whether the panorama switch 18 has been turn ON or not. If the panorama switch has been turned ON, the routine proceeds to a step 603 at which a position of the lens barrel, i.e., a position of the objective 34, is detected on the basis of the output signal of the encoder circuit 24. Then, it is determined from this detection whether the objective 34 is at the minimum focal distance position (corresponding to the wide angle side end) or not (step 604).

If it is determined at said step 604 that the objective 34 is at the wide angle end, an effective panoramic picture should be obtained with the objective 34 being at this position. Accordingly, the routine proceeds to a step 608 at which the zoom switches 12, 14 are disabled so that the objective 34 cannot be zoom-driven even when said zoom switches 12, 14 are erroneously operated, and thereafter the camera 30 is brought into the standby state (step 504).

If the determination made at said step 604 is NO, the routine proceeds to a step 605 at which the release is disabled so that the shutter cannot be released, even when the shutter switches 8, 10 are turned ON, and then a lens barrel driving subroutine is run (step 606). In the lens barrel driving subroutine, the drive motor 20 is actuated to move the objective 34 to the wide angle side end. Once the objective 34 has reached the wide angle end, the subroutine returns to the panorama mode processing routine and proceeds to a step 607, at which the inhibition of the shutter release made at the step 605 is nullified, i.e., the shutter release is enabled. Then the routine proceeds to a step 608 at which the activation of the zoom switches is disabled, and thereafter the camera 30 is brought into the state of standby (step 504).

When the second stage shutter switch 10 is turned On by operating the release button 52 in the previously mentioned manner, the shutter is release and an effective panoramic photograph having a wide angle of view is achieved since the objective 34 is positioned at the minimum focal distance (steps 604, 606).

In the mode of panoramic photographing, the objective 34 remains at the minimum focal distance position and the panoramic picture of wide view angle is reliably obtained even when the zoom switches 12, 14 are erroneously operated by a photographer so far as these zoom switches 12, 14 are previously disabled to be activated as will be apparent from the flow chart illustrating this embodiment. It should be understood that, if processing at the step 608 is not done, the panoramic photographing is possible even when the objective 34 is out of the minimum focal distance.

As shown by FIG. 2 and FIG. 3(b), the photographing mode display 42 represented by a letter "P" appears below knob member 35 as said knob member 35 is operated in preparation for the panoramic photographing. Knob member 35 is arranged laterally adjacent the viewfinder 36, for the photographing mode display 42 for a photographer who is sighting the object through the viewfinder 36, namely, the photographer can recognize at this moment of sighting that the camera 30 is in the mode of panoramic photographing. Thus, the photographer may align the panoramic sighting frame with the object within the viewfinder 36 shown by FIG. 4 to obtain a panoramic picture of desired composition.

Referring to FIG. 3(a), the portion of the actuator plate 40 having no display thereon appears as the knob member 35 is operated to switch the photographing mode from the mode of panoramic photographing to the mode of normal photographing, indicating that the camera is in the mode of normal photographing.

While the knob member 35 serving as a manipulator in this specific embodiment has been described as being provided externally of the camera body, it may be also provided internally of the camera body, for example, so as to be covered by the loaded film. The arrangement containing the manipulator within the camera 30, all frames of the loaded film will be exposed in the same mode of photographing. As will be obviously appreciated, the mode of photographing can be selected for each frame with the arrangement having the manipulator externally of the camera 30.

Second Embodiment

FIG. 7 is a block diagram of a circuit arrangement incorporated in a camera 30 similar to that shown by FIG. 1 including a CPU 2 at the center of the arrangement, in which the same components as those in the arrangement of FIG. 1 are designated by the same reference numerals and description of these components are eliminated for brevity.

To CPU 2, these are connected the shutter controller 26, the motor driver 27 and the strobe 28. Information on shutter speed, stop value and other values is exchanged between the CPU 2 and the shutter controller 26. The motor driver 27 is responsive to a film feed signal provided from the CPU 2 to drive an electric motor 27a for film advancing or rewinding. Based on the object luminance information, the CPU 2 applies a strobe flashing signal to the strobe 28. A light emitting diode 54 adapted to be activated when the panorama switch 18 is turned ON is electrically connected to the CPU 2.

Referring to FIG. 8, the light emitting diode 54 is located in a state display area which is, in turn, provided laterally of the viewfinder 36. FIG. 8(a) shows an arrangement in which there is provided a single light emitting diode 54 at a vertically middle position laterally adjacent the viewfinder 36 and FIG. 8(b) shows an alternative arrangement in which there are provided a pair of light emitting diodes 54 on a vertical edge of the viewfinder 36 laterally adjacent the panoramic sighting frame 46.

When the panorama switch 18 is turned ON for the panoramic photographing, the light emitting diode 54 is activated. When the light emitting diode 54 is turned on, light comes into the sight of the photographer who is sighting the object through the viewfinder 36, and thereby the photographer recognizes that the camera is in the mode of panoramic photographing. Thus, a desired panoramic picture is obtained by sighting the object within the panoramic sighting frame 46 so as to define an appropriate composition. Apprehension that the photographer might erroneously sight the object through the normal sighting frame 44, although the panoramic photographing is intended, can be minimized by providing the light emitting diodes 54 adapted to on light laterally adjacent the panoramic sighting frame 46, as shown by FIG. 8(b).

When panorama switch 18 is turned ON, the objective 34 is moved to the minimum focal distance position just as in the previously mentioned First Embodiment. It should be understood that the manipulator used for switching of the photographing mode is not limited to the knob member 35 and may be, for example, a switching button.

Third Embodiment

FIG. 9 is a block diagram of a circuit arrangement incorporated in an camera 30 similar to that shown by FIG. 1, including a CPU 2 at the center of the arrangement, in which the same components as those in FIGS. 1 and 7 are designated by the same reference numerals and description of these components are eliminated for brevity.

To CPU 2, there is connected a liquid crystal display unit (LCD) 56 which is located on the top surface of the camera 30, as seen in FIG. 2. There are arranged on this liquid crystal display unit 56, as shown by FIG. 10(a), a film frame count display 58, a film feed display 60, a strobe flashing display 62, a telephoto mode display 64, a self-timer photographing mode display 66 and a panoramic photographing mode display 68.

When the panorama switch 18 is turned ON, the panoramic photographing mode display 68 is activated to appear on the liquid crystal display unit 56, indicating to the photographer that the camera is in the mode of panoramic photographing.

FIG. 10(b) shows alternative arrangement in which the film frame count display 58 is used to indicate that the camera is in the mode of panoramic photographing. More specifically, when the camera 30 is brought into the standby state as the panorama switch 18 is turned ON, a segmental display represents the letter "P" instead of the film frame count, indicating that the camera 30 is in the mode of panoramic photographing.

FIG. 11 shows a display along which the film frame count display 58 is utilized to display the mode of panoramic photographing. The camera 30 is in a state waiting for turning ON of the main switch ($S_M$) 16 (step 1101). With the main switch 16 still in the OFF state, the liquid crystal display unit 56 remains put out and displays nothing (step 1102). If the main switch 16 has been turned ON, it is determined whether the first state shutter switch ($S_1$) 8 has been turned ON (step 1103) and, if switch ($S_1$) 8 has already been turned ON, the routine proceeds to a step 1104 at which the film frame count is displayed. Then, the camera waits for turning ON of the second stage shutter switch ($S_2$) 10 (step 1105). After the second stage shutter switch 10 has been turned ON, the shutter is released (step 1106) to effect an exposure. Upon completion of the exposure, the motor 27a is driven to start film feed (step 1107) and the film feed display 60 is put on the liquid crystal display unit 56, indicating that the film is being fed (step 1108). Then it is determined whether film feeding has been completed (step 1109) and, if so, the motor 27a is stopped (step 1110).

The film feed display 60 on the liquid crystal display unit 56 is turned off (step 1111), the film frame count is incremented (step 1112), and it is determined whether the first stage shutter switch 8 has been turned ON (step 1113). The determination at step 1113 is based on a determination of whether the photographer has released his or her finger's hold on a release button 52. The routine waits until the photographer releases his of her finger's hold on the button 52 and, after the finger's hold has been released, the routine proceeds to a step 1114. Also when it is determined at said step 1103 that the first stage shutter switch 8 has not been turned ON, the routine proceeds to the step 1114.

At the step 1114, it is determined whether the panorama switch ($S_P$) 18 has been turned ON and, if it has already been turned ON, the segments of the film frame count display 58 on the liquid crystal display unit 56 is utilized as the panoramic photographing mode display 68 and thereby the letter "P" is displayed. Thereafter, the routine returns to the step 1101. If it is determined at the step 1114 that the panorama switch 18 is OFF, the letter "P" represented by the segments of the film frame count display 58 is put out and the film frame count is displayed. Then, the routine returns to the step 1101.

Specifically, in the mode of panoramic photographing, this mode of photographing is displayed by putting the letter "P" on the film frame count display 58 (step 1115) so long as the camera 30 is in the standby state and, when the release button 52 is partially depressed to turn the first stage shutter switch 8 ON, the film frame count is put on the film frame count display (step 1104). Accordingly, before the release button 52 is fully depressed, the photographer can recognize the mode of photographing by visually checking the liquid crystal display unit 56. Namely, the camera is in the mode of normal photographing when the film frame count is displayed and in the mode of panoramic photographing when the letter "P" is displayed.

As in the previously described first embodiment, the objective 34 is moved to the minimum focal distance position as said panorama switch 18 is turned ON. The manipulator used to switch the mode of photographing is not limited to the knob member 35 and may be, for example, a switching button.

While the invention has been described in connection with preferred embodiments, those skilled in the art will recognize that changes can be made without departing from the spirit of the invention, and thus that the scope of the invention is not limited to these embodiments.

What is claimed is:

1. A photographic camera having also the function of panoramic photographing, comprising:
   a body;
   a lens barrel supported on said body;
   variable focus means supported on said body and coupled to said lens barrel, said variable focus means including a motor drive to move an objective, and thereby to vary a focal distance, over a continuous range;
   an encoder supported between said body and said lens barrel for detecting the relative position of said lens barrel to thereby determine the objective position;
   a manipulator on the exterior of said body and externally accessible for selectively switching between a mode of normal photographing in which a picture of normal size is obtained and a mode of panoramic photographing in which a picture of panoramic size is obtained wherein each photograph on a roll may be individually selected for panoramic or normal photography;
   panoramic components positioned in said body and including plates for changing the dimensions of an aperture through which film is exposed in said camera whereby the size of a picture taken using the photographic camera may be altered between normal and panoramic dimensions when said manipulator is operated to select a photographic mode; and
   means for controlling said motor drive to position said objective at the minimum focal distance position automatically when said externally accessible manipulator is operated to select the mode of panoramic photographing and said encoder indicates that the objective is not at said minimum focal distance.

2. A photographic camera having also a function of panoramic photographing as recited in claim 1, wherein, when the mode of panoramic photographing is selected, said objective is moved to the minimum focal distance position and locked on this position so that the focal distance of said objective can not be varied while the camera is in the mode of panoramic photographing.

3. A photographic camera having also the function of panoramic photographing as recited in claim 1, wherein said manipulator comprises a knob member adapted to be slidably movable relative to a camera body and photographing mode display means adapted to display at least one of said mode of normal photographing and said mode of panoramic photographing is operatively associated with said knob member so that said photographing mode display means appears on the external surface of the camera body as the knob member is slidably moved to select said one of the photographing modes.

4. The photographic camera as defined in claim 1, wherein said body includes a rear cover which is operable to load film into said camera body, and wherein said manipulator includes a knob member positioned on said camera and slidably movable relative to said camera body, said knob positioned on the exterior of said camera such that it is manipulatable when the rear cover is closed, and said manipulator further including a photographing mode display displaying at least one of said mode of normal photographing and said mode of panoramic photographing, said mode display operatively associated with said knob member so that said at least one photographing mode is displayed at the location on the external surface of the camera body which is vacated by said knob member when said knob member is moved to change the mode of the camera to said at least one mode which is displayed.

5. A photographic camera having also the function of panoramic photographing as recited in claim 4, wherein said manipulator is provided laterally of a viewfinder.

6. A photographic camera having also the function of panoramic photographing as recited in claim 1, further comprising state display means adapted to display a current state of the camera so that, when the mode of panoramic photographing is selected, said state display means displays that the camera is in the mode of panoramic photographing.

7. A photographic camera having also a function of panoramic photographing as defined in claim 1, further including:
a state display means adapted to display a current state of the camera;
said state display displaying that the camera is in the mode of normal photographing by displaying a count of the number of exposed frames on a film roll and displaying that the camera is in the mode of panoramic photographing when the mode of panoramic photographing is selected by displaying a P in the display area for one of the picture frame count numbers displayed in the normal photographing mode.

8. A photographic camera having also the function of panoramic photographing as recited in claim 1, further comprising a sighting frame for normal photographing and a sighting frame for panoramic photographing both arranged within a visual field of a viewfinder.

9. A photographic camera having also a function of panoramic photographing as defined in claim 1, further comprising:
a viewfinder including a sighting frame for normal photographing and a sighting frame for panoramic photographing both arranged within the visual field of a viewfinder, one of said normal sighting frame and said panoramic sighting frame identified using an indicator positioned adjacent said one sighting frame and illuminated when the mode associated with said one of said frames is selected.

10. A photographic camera having also the function of panoramic photographing as recited in claim 1, wherein there are provided within a visual field of a viewfinder of sighting frame for normal photographing, a sighting frame for panoramic photographing and photographing mode display means so that said photographing mode display means displays the photographing mode selected by operation of said manipulator.

11. A photographic camera having also the function of panoramic photographing as recited in claim 2, wherein said manipulator comprises a knob member adapted to be slidably movable relative to a camera body and photographing mode display means adapted to display at least one of said mode of normal photographing and said mode of panoramic photographing is operatively associated with said knob member so that said photographing mode display means appears on the external surface of the camera body as the knob member is slidably moved to select said one of the photographing modes.

12. A photographic camera having also the function of panoramic photographing as recited in claim 3, wherein said manipulator is provided laterally of a viewfinder.

13. A photographic camera having also the function of panoramic photographing as recited in claim 2, further comprising state display means adapted to display a current state of the camera so that, when the mode of panoramic photographing is selected, said state display means displays that the camera is in the mode of panoramic photographing.

14. A photographic camera having also the function of panoramic photographing as recited in claim 2, further comprising a sighting frame for normal photographing and a sighting frame for panoramic photographing both arranged within a visual field of a viewfinder.

15. A photographic camera having also the function of panoramic photographing as recited in claim 2, wherein there are provided within a visual field of a viewfinder a sighting frame for normal photographing, a sighting frame for panoramic photographing and photographing mode display means so that said photographing mode display means displays the photographing mode selected by operation of said manipulator.

16. A photographic camera having also the function of panoramic photographing as recited in claim 10, wherein said photographing mode display means comprises a display lamp so that said display lamp is put on light when any one of the normal photographing mode and the panoramic photographing mode is selected by operation of said manipulator.

17. The photographic camera having also a function of panoramic photographing as defined in claim 9, wherein said indicator includes a lamp positioned directly adjacent said viewfinder and at substantially the vertical center of said viewfinder and illuminated only when panoramic photographing is selected.

18. The photographic camera having also a function of panoramic photographing as defined in claim 9, wherein said indicator includes a respective lamp directly adjacent said viewfinder and laterally spaced from at least one said panoramic sighting frame and illuminated only when panoramic photographing is selected.

19. The camera as defined in claim 1, further including zoom switches on said camera and means for disabling said zoom switches when said panoramic mode is selected.

20. The camera as defined in claim 19, further including a shutter and means for disabling said shutter while said camera changes to said panoramic mode.

21. A photographic camera having also the function of panoramic photographing, comprising:
a body;
variable focus means supported on said body and utilizing a motor drive to move an objective and thereby to vary a focal distance over a continuous range;
at least one zoom switch connected to said motor and controlling said motor to move said objective;
a manipulator on the exterior of said body and externally accessible for selectively switching between a mode of normal photographing in which a picture of normal size is obtained and a mode of panoramic photographing in which a picture of panoramic size is obtained wherein each photograph on a roll may be individually selected for panoramic or normal photography using said manipulator;
panoramic components positioned in said body and including plates for changing the dimensions of an aperture through which film is exposed in said camera whereby the size of a picture taken using the photographic camera may be altered between normal and panoramic dimensions when said manipulator is operated to select a photographic mode; and
a controller disabling said zoom switch and controlling said motor drive to position said objective at the minimum focal distance position automatically when said externally accessible manipulator is operated to select the mode of panoramic photographing.

22. The camera as defined in claim 21, wherein said controller further includes means for disabling the camera's shutter when the motor is moving the objective to the minimal focal distance.

23. A photographic camera having also the function of panoramic photographing, comprising:
a body;
variable focus means supported on said body and utilizing a motor drive to move an objective and thereby to vary a focal distance over a continuous range;
a manipulator on the exterior of said body and externally accessible for selectively switching between a mode of normal photographing in which a picture of normal size is obtained and a mode of panoramic photographing in which a picture of panoramic size is obtained wherein each photograph on a roll may be individually selected for panoramic or normal photography;
panoramic components positioned in said body and including plates for changing the dimensions of an aperture through which film is exposed in said camera whereby the size of a picture taken using the photographic camera may be altered between normal and panoramic dimensions when said manipulator is operated to select a photographic mode; and
a controller disabling said shutter and controlling said motor drive to move said objective to the minimum focal distance position automatically when said externally accessible manipulator is operated to select the mode of panoramic photographing, said controller releasing said shutter when the minimal focal distance position is reached.

24. The camera as defined in claim 23, further including an encoder coupled to said motor for detecting a position of said motor to determine if the objective is at its minimal focal distance.

* * * * *